Patented Apr. 25, 1939

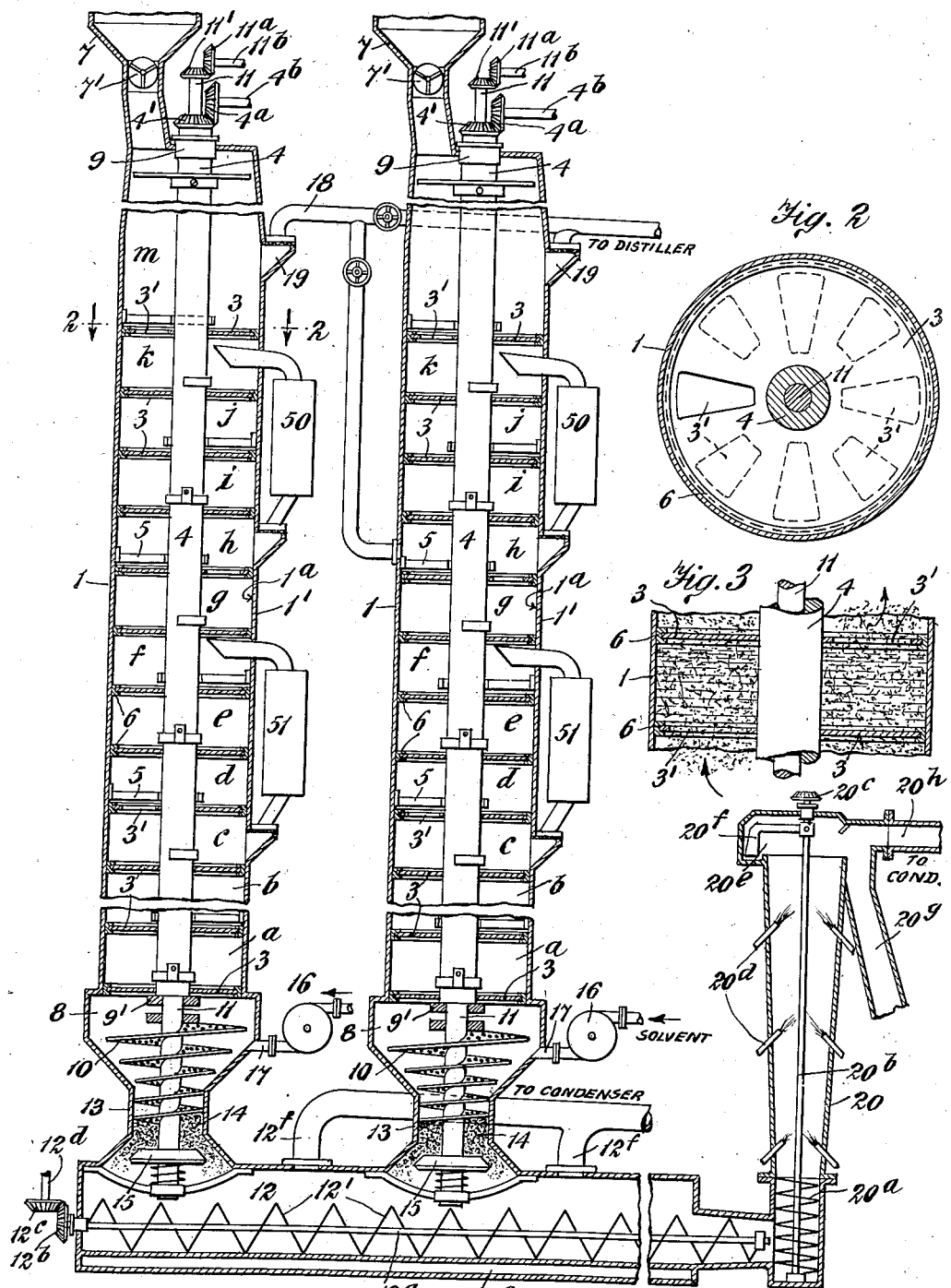

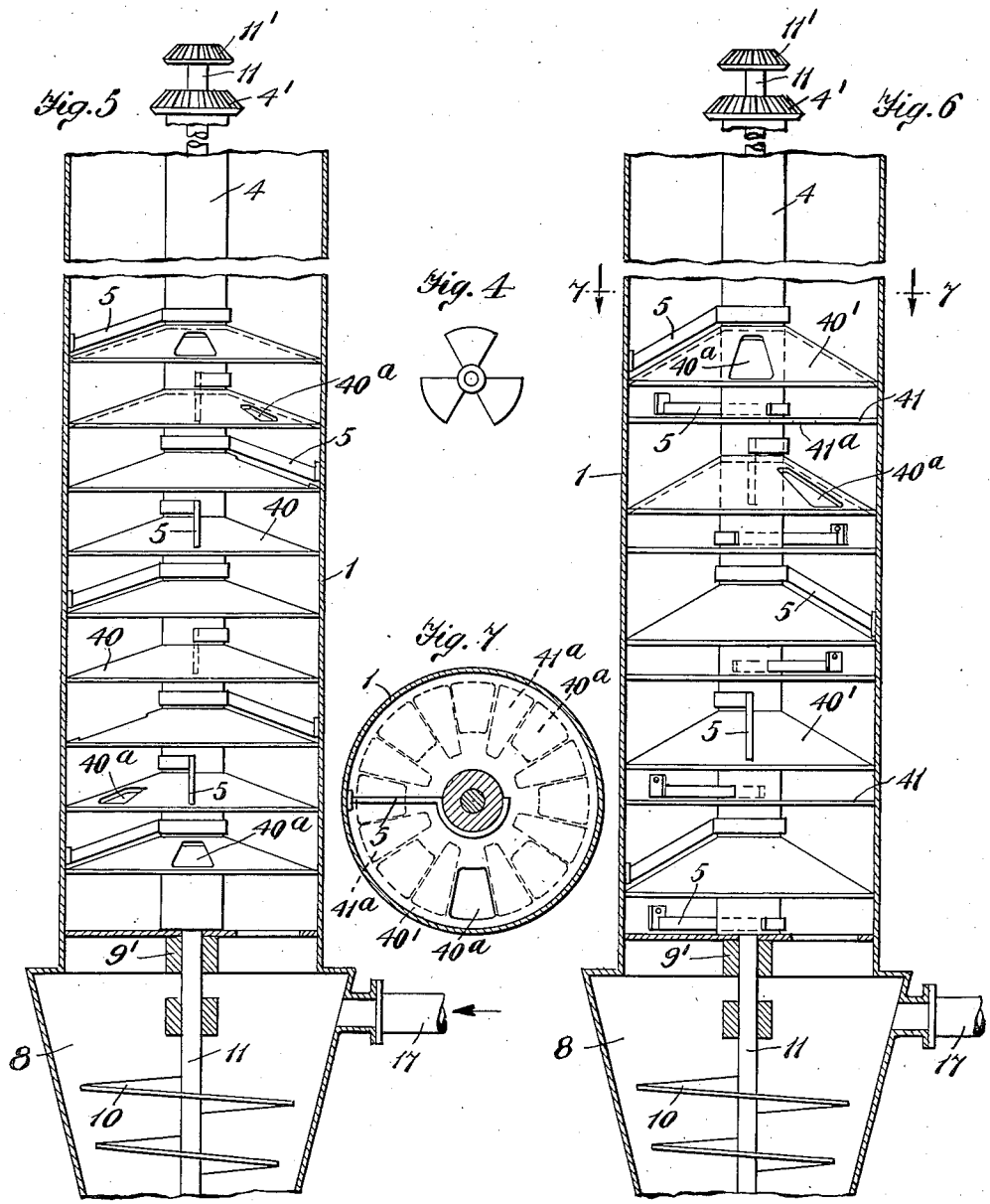

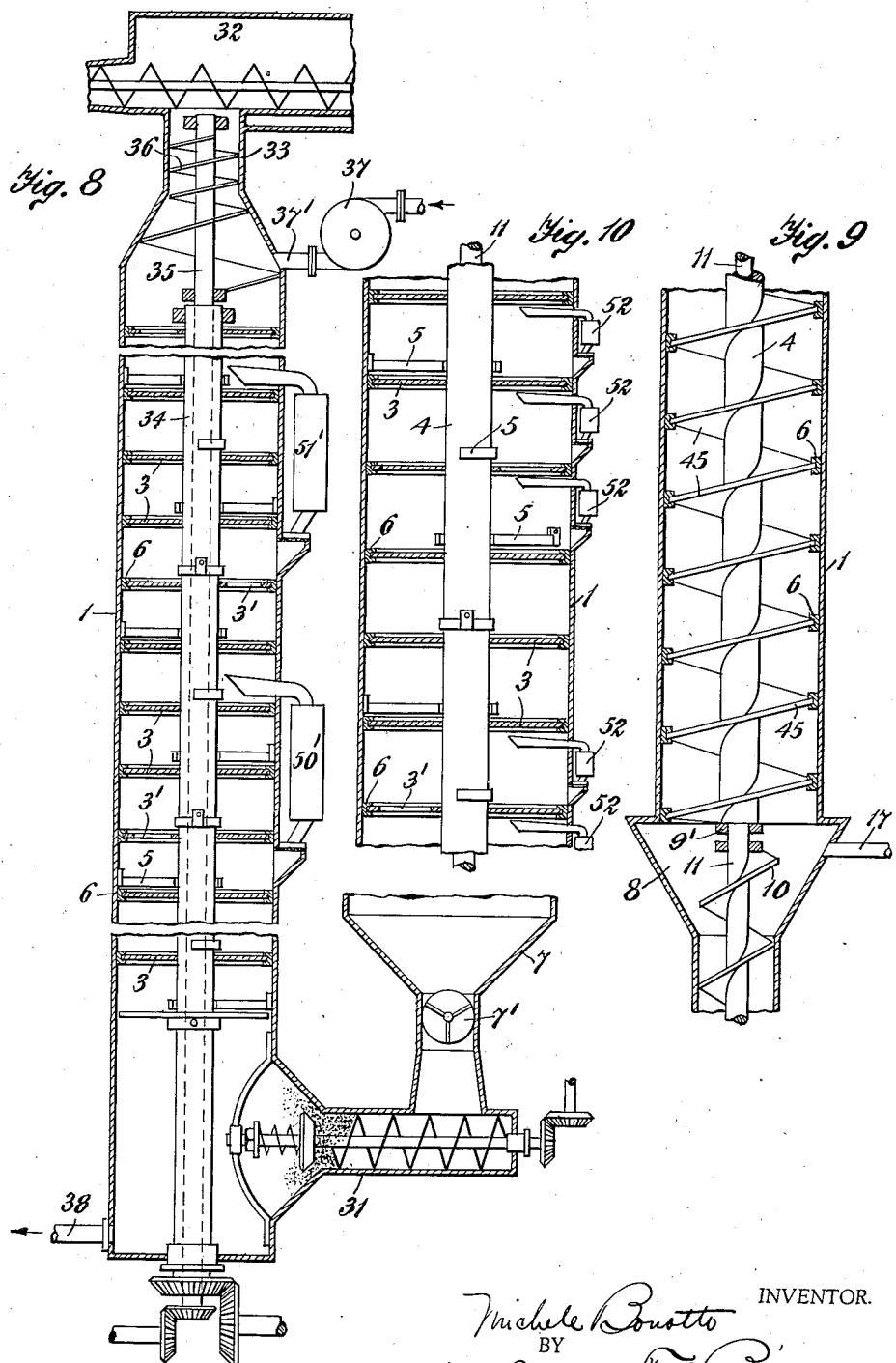

2,156,236

UNITED STATES PATENT OFFICE 2,156,236

PROCESS AND APPARATUS FOR EXTRACTION OF OILS, FATS, AND OTHER SOLUBLE CONSTITUENTS FROM MATERIALS CONTAINING THE SAME

Michele Bonotto, Evansville, Ind., assignor to Extractol Process, Ltd., Wilmington, Del., a corporation of Delaware Application November 7, 1935, Serial No. 48,646

15 Claims. (Cl. 87—6)

This invention relates to improvements in process and apparatus for extraction of oils, fats and other soluble constituents from materials containing the same, and constitutes an improvement upon the process disclosed in my pending application Serial No. 757,008 filed December 11, 1934.

In my said pending application a solid oil-bearing material which is preferably flaked, is continuously fed and non-mechanically moved by gravity or buoyancy in a continuance countercurrent with a liquid solvent, through an unobstructed extraction tank having a series of extraction zones separation of which is controlled by non-positive delimiting factors comprising heat applied to varying zones of the tank and pressure applied to the solvent. I thus provide undelimited extraction zones in which, however, given quantities of a solvent liquid may be applied to given quantities of the material to be extracted and the strength of the applied solvent in a particular extraction zone will vary in inverse proportion to the content of unextracted oil in the material passing through such zone, thus providing effective and economical extraction, and which zones preferably comprise an initial treating zone employing used solvent on the fresh material, an intermediate zone employing stronger used solvent on intermediate material from which oil has already been initially extracted and a final treating zone, in which fresh solvent is applied to material which has been treated in the two preceding extraction zones. By this process, if the solvent and solid material are thoroughly intermingled, oil may be economically extracted from the material and the solvent employed will in its passage through the zones be highly enriched with oil, thus producing a highly oil-enriched miscella with economy of solvent and enabling a high yield of oil with relatively inexpensive distillation. As the material is non-mechanically moved, pulverization of the oil-bearing materials and frequent blocking of the process due to the conventional conveyance of such material by conveyor screws is avoided. Said material after extraction of oil therefrom and as it passes from said extraction tank is preferably formed into a liquid-impermeable plug which enables the liquid solvent to be continuously fed through said tank in counter current or in a direction opposite to the movement of said solid oil-bearing material. The feed and pressure of said liquid solvent is controlled by pressure-exerting means such as a pump, and the treating zones within the tank are prescribed by applying heat, preferably of varying degrees, to the liquid therein, preferably from the outside at a series of given positions along the travel of the solvent and also preferably providing for secondary circulating movements of the liquid in the zones of the tank.

It will be understood that if a solvent like gasoline, (which is lighter than the flaked solid material) be used, the solvent will be pumped in an upward direction through the tank and the material will be fed downwardly therethrough by gravity, whereas, if a liquid solvent of greater specific gravity than the flaked solid material be employed, this liquid solvent will be pumped downwardly through the flaked solid material in the extraction tank while the solid material will be fed in an upward direction through the solvent in said tank and the buoyancy of the material in the liquid solvent will be depended upon to cause the upward movement thereof through the solvent.

It is desirable that only the substantial minimum quantity of solvent which will, in countercurrent, extract all the oil from the solid or flaked oil-bearing material be employed in order to avoid an excessive distillation and handling of the solvent and material, it being obvious that if the solid oil-bearing material be fed in small quantities through a tank containing a large excess of solvent, the handling of such solvent to separate the oil therefrom would make the process uneconomical and if the other extreme is followed a large percentage of oil would still remain in the extracted material. In view of these facts I employ or utilize a maximum quantity of solid oil-bearing material with the minimum quantity of solvent that will produce, during the countertravel thereof, a rich miscella or mixture of oil with solvent. The solid material is, therefore, fed to the tank in such quantities and the solvent is fed in the opposite direction in such quantities as to permit a proper inter-mixture thereof without substantial excess of the solvent.

In practising my process hereinabove referred to with material and a solvent in proper proportion, I have found that the solvent when pumped through a tank containing such material does not tend to follow an even path in its movement through such material in the tank but has a tendency to form channels through such solid materials thus leaving part of such material untouched or only partly contacted with the result that the extraction is not evenly effected.

While the height of the tanks might be greatly increased and a large number of agitators might be employed therein in order to break up such channels, and procure a mixture of the liquid solvent and solid material, this is undesirable as it would result in pulverizing the solid or flaked material and one of the principal objects of the invention hereinabove referred to is to avoid mechanical agitators or conveyor screws or other mechanical apparatus which pulverize or disintegrate the material and to rely upon gravity or potential energy to avoid such pulverization.

Also when the height of the extraction tanks is increased the resistance that the solvent encounters in passing through the material to be extracted is, due to the weight of the material, also greatly increased so that a relatively high pressure of the feeding pump for the solvent would be required, especially if the material to be extracted be finely flaked or finely ground.

My invention is hereinabove described with reference to the accompanying drawings, in which Fig. 1 is a view in vertical section of a partitioned extraction mechanism of my invention including two extraction units adapted for use with light solvent; Fig. 2 is a section on the line 2—2 of Fig. 1, looking in the direction of the arrows; Fig. 3 is a fragmentary vertical section of one of the extraction compartments shown in Fig. 1; Fig. 4 is a plan view of a modified form of partition having a plurality of apertures instead of a single aperture as shown in Figs. 1, 2 and 3; Fig. 5 is a vertical section of an extraction unit embodying another modified form of partition embodying my invention; Fig. 6 is a vertical section of an extraction unit showing still another modified form of partition included in my invention; Fig. 7 is a section on the line 7—7 of Fig. 6, looking in the direction of the arrows; Fig. 8 is a vertical section of a modified form of my invention suitable for use with heavy solvent; Fig. 9 is a vertical section of an extraction unit showing another modified form of my invention; Fig. 10 is a fragmentary section of still another modified form of my invention.

In accordance with my present invention, I am enabled to avoid employment of a large number of agitators which tend to pulverize and pack the material within the extraction zones of the tank and also to avoid extraction tanks of excessive height.

In accordance with the preferred form of my present invention, I utilize an extraction tank of cylindrical conformation and preferably divide the said tank into a plurality of temperature zones as hereinabove specified and also into a number of intermingling zones as hereinabove specified and also into a number of intermingling zones separated from each other by transversely-extending partitions adapted to guide the solid material and liquid solvent into contact with each other, and these partitions are arranged to divide the entire tank-charge of material into a series of independently-supported blocks and to support in each block a predetermined load or charge of material thus controlling packing action of the material and preventing such packing thereof as would otherwise be likely to clog the apparatus. These partitions are adapted to retard the downward vertical movement of the solid material through the solvent, (which is due to gravitation when a solvent of lighter specific gravity than the material is employed) or to retard the upward vertical buoyant movement of such solid material through the solvent when a heavier liquid solvent is employed. The partitions are preferably caused to revolve while the solid material is preferably held against rotation by the employment of a vertically-disposed stationary member or arm, and a damming effect of such material at one side of said arm occurs while a sector-shaped free space filled with solvent and of a height slightly greater than the height of said arm occurs at the opposite sides thereof, the dammed material finally flowing over the edge of the arm into this free solvent-filled space to provide a secondary intermingling of material and solvent. The solid material thus supported by the revolving partitions and held against rotation is moved or permitted to have a retarded movement by potential energy. At the same time the liquid solvent is guided into contact with said material and evenly distributed therethrough.

In the embodiments of my invention shown in Figs. 1 to 8 and 10 a charge of solid material is successively fed from one intermingling zone into successive intermingling zones from the top of the tank to the bottom or vice versa in accordance with the type of solvent employed, and in each zone a portion of the entire tank charge of material will be supported or held by a separate partition preferably comprising a disc mounted on a centrally-revolving shaft which disc will preferably revolve in horizontal plane as shown in Fig. 1. In this way I am enabled to divide the gravitational weight or upward buoyant energy of the material contained in the extraction tank into a series of subdivided zones and thus to avoid the high resistance due to the weight or buoyancy of said material as hereinabove specified. For example, assuming that I employ gasoline as the solvent, if the weight of the material contained in the extractor tank is four thousand (4000) pounds, such weight will preferably be divided into twenty zones, so that each zone will contain two hundred (200) pounds.

In the preferred form of my invention illustrated in Fig. 1, the extraction section 1' of a tank or unit 1 is divided into a series of intermingling zones $a$, $b$, $c$, etc., by a series of discs 3 mounted on a central shaft 4 to revolve in a horizontal plane without causing the solid material to revolve therewith and vertically-disposed baffle plates 5 supported on the sides of the tank 1 intermediate said zones are preferably provided to avoid any such revolving movement of the material with the discs 3. As illustrated in Fig. 1, each of the discs 3 is provided with a radially-disposed feed aperture or communicating opening 3' and the aperture or opening in one disc is placed in a position out of vertical registration with the aperture or opening of the adjacent preceding and succeeding discs so that rotation of the feed through one of these slots of solid material will cause the same to be distributed in the succeeding zone; and the solvent, as it moves through these zones will be compelled to follow a tortuous or spiral path through the zones and tank, and will be prevented from following a direct vertical path or channel through such tank. The fixed plates 5 are of less height than the depth of the zones in which they are positioned and during rotation of the solid portion of the discs, they provide a material dam against which material at one side piles up loosely and then flows over the top to fall into a solvent-filled open space in the material which is produced or opened up at the opposite sides of said plates by rotation of said discs.

In order to prevent any substantial quantity of solvent from passing between the edges of the discs and the wall of the tank, I preferably employ a tank having a perfectly cylindrical extraction portion, and provide discs having diameters closely conforming to the inner diameter of the tank so that there will be no substantial clearance between the edges of the discs and the wall of the tank, and in some cases, I provide between the wall of the tank and the edges of each of the discs a stuffing or expansion ring 6 which will more effectively prevent solvent from passing between such edges of the disc and tank wall. The stuffing member 6 may obviously be fastened either to rotating partitions or to the tank wall, as desired.

An extractor tank of this type having such interminigling zones between its ends is in the case of a tank adapted for use with a light solvent such as gasoline provided at its top with a feed hopper 7 of conventional type and preferably is provided at its lower end with an expansion chamber and as shown I provide the tank 1 with an expansion chamber 8 of greater diameter than the extraction section.

In the preferred embodiment of my invention illustrated in Fig. 1, the disc-revolving shaft 4 terminates within the expansion chamber and is supported at opposite ends in bearings 9, 9'. An independently-rotated discharging-screw conveyor 10 is preferably mounted within the expansion chamber of said tank, and as shown, is mounted on a separate shaft 11 having its upper end supported within said expansion chamber and the other end extending into a drier or receiving compartment 12 communicating with said expansion chamber 8 by a discharge conduit 13 within which the discharging screw-conveyor 10 extends and within which discharge conduit a liquid-impermeable plug of material 14 is formed by cooperation between the said discharging screw conveyor 10 and a spring-pressed valve 15 supported on the said independently-rotated shaft 11 of the screw conveyor 10.

In the construction shown the shaft 11 is supported coaxially with the disc-revolving shaft 4, extending axially through the latter to the top of the tank 1, and driving elements for said shafts are employed at the top of the tank for independently rotating said shafts. Thus bevel gears 11', 11ᵃ and shaft 11ᵇ operated from any suitable source of power not shown are used for the shaft 11, while bevel gears 4', 4ᵃ and shaft 4ᵇ are employed for the shaft 4.

In the construction shown in Figs. 1 to 3, solvent is pumped by pump 16 through a pipe or conduit 17 into the lower end of the unit and, as shown, into the expansion-chamber portion 8 thereof while solid material is fed into the upper end of the unit through a suitable feed hopper 7 and feeder 7' while the enriched solvent or miscella mixture passes out of the tank through a conduit 18 connected adjacent to the upper end of the tank preferably above the extraction section at 19.

The operation of the device just described will be made clear from the following:

Assuming now that an extractor tank is subdivided as hereinabove described into a series of sections or intermingling zones 2 filled with solid material as above described; assuming also that solvent is pumped from the bottom and that the clearance between the discs 3 and the interior surface 1ᵃ of the cylinder wall is such that no liquid is allowed to pass and assuming further that the shafts 4 and discs 3 are not being rotated, the pumped liquid solvent will be forced to pass through the aperture or opening 3' of the lower disc 3 to reach the lowermost intermingling section a and in view of the fact that the aperture 3' in the next succeeding disc 3 is out of registration with the aperture in said lowermost disc 3, preferably to the extent of 60° to the right, the solvent in order to reach the next intermixing section or zone b, must pass through the material to be extracted within said lowermost zone a in order to reach the aperture 3' in second disc 3, through which it must pass to reach second intermingling section or zone b. In other words, with the disposition of the apparatus and discs as hereinabove stated, the liquid solvent will be prevented from following a direct vertical path upwardly but will be compelled to follow an inclined path through a zone or section toward the next slot, and as the same movement occurs when the solvent passes from intermixing section or zone b to intermingling section or zone c through the opening or apertures 3' in the third disc 3 (which is also placed, for example at a position 60° to the right of the aperture 3' in second disc 3), the said solvent will be compelled in its passage through all of the said sections or zones to follow a zigzag or tortuous path.

Now, assuming that during the passage of solvent from the bottom of the unit upwardly, the shafts 4, 11 and the discs 3 are rotated while the material in the zones or sections a, b, c, etc., between the discs 3 does not revolve with the discs, the spiral, zigzag or tortuous path of the solvent is changed constantly because the aperture in the disc through which the solvent is first introduced into the extraction portion of the apparatus is being revolved, as are the apertures in the succeeding discs, through which the solvent must pass, and when the aperture is lowermost disc 3 and simultaneously the apertures in the other discs have accomplished a complete revolution, all the material disposed between the top and bottom discs and which, as aforesaid, does not revolve, will have been completely washed by the rotating, zigzag, or tortuous streams of solvent.

Now let us follow the feed of the solid material. We have heretofore assumed that all the intermingling zones or sections of the apparatus are filled with material to be extracted. In that condition no new material can pass from the top portion or the feed chamber m through the opening 3' in the top disc 3 because the extraction zone k, which is also full of material will not allow any passage of solids to fall by gravity from the upper feed chamber m to the upper extraction section. By drawing some material, however, from the expansion chamber at the lower end of the unit and thus discharging material from the tank, space or room will be available and provided which will be filled with material from section a, material from this section passing by gravity through the aperture 3' in lowermost disc 3. The space left in section a because of material which passed from section a to the bottom or expansion chamber will now be filled by material coming from section b through the aperture 3' in the second disc number 3, thus leaving space for material coming from succeeding section c and so on. It will be seen, therefore, that if the shaft and disc be rotated as hereinabove specified, the portion of material which passes from one section to another will not always come from the same spot or part of the block or charge within a section but will, because the aperture of the disc is revolving, be fed or come from the entire area of the lower layer of said block or charge of material and will be distributed within the lower adjacent section.

It will be obvious that in this way a countercurrent movement of the solvent from the bottom to the top and of the solid material from the top to the bottom of the extraction unit will be effected and there will be an effective intermingling of the solid material and solvent within the sections and also when such material and solvent meet in passing through the apertures in the various discs.

The shafts 4 and 11 are, as aforesaid, independently driven and the flow of material through the extractor may be regulated by the speed of the discharging screw-conveyor.

The depth of the sections or zones, which delimits the thickness of the block of solid material to be washed by the solvent, will be determined by the distance between the discs and this distance is preferably variable with the kind of material treated and the degree of fineness thereof.

In the preferred embodiment of my invention shown, the baffles 5 are provided and as shown, these baffles are supported on the inner surface of the side wall of the extractor.

By subdividing the extraction part of the unit into a series of zones as above described, the weight of the material being treated is also subdivided, and we therefore are enabled not only to decrease the resistance that must be overcome by the solvent before passing through a given mass of material but we are also enabled to avoid all possibility of the solvent forming channels through the material. Consequently, we are enabled to produce a more efficient extraction with economy of solvent.

Another important feature of my invention is that the inclusion of fine particles in the material to be extracted will not produce an objectionable condition as has been the case in other continuous extractors heretofore employed, but on the contrary, a certain degree of fineness of the material will be desirable, and it will be obvious that the finer the degree of material to be extracted, the easier and quicker will be the extraction.

In the preferred embodiment of my apparatus shown in Fig. 1, the material discharged into the drier or receiving compartment 12 will be conveyed through the said drier by a conveyor screw 12', mounted on the shaft 12ª, into a vertically disposed solvent eliminator 20. The shaft 12ª is, as shown, rotated by gears 12ᵇ, 12ᶜ, the latter of which is rotated by shaft 12ᵈ from any suitable source of power not shown. In the solvent eliminating tank 20, I preferably provide a vertically disposed screw 20ª mounted on a shaft 20ᵇ suitably supported therein and driven at the upper end through a gear 20ᶜ from any suitable source of power not shown.

In the passage of the material through the drier 12, which is provided at its lower portion with a steam chest 12ᵉ solvent will be driven off through the conduits 12ᶠ to a suitable condenser not shown. In the passage of the material through the solvent eliminator 20 the material is subjected to the action of superheated steam for the purpose of eliminating the final traces of solvent from the material.

After passage through the tank 20 the material enters the head 20ᵉ which is provided with a pusher 20ᶠ and is finally deposited in the conduit 20ᵍ, the steam and entrained solvent passing through the conduit 20ʰ to a condenser not shown.

In Fig. 2 I have illustrated the varying positions of the apertures 3' in relation to the discs 3, and I also preferably vary the shape of these apertures as illustrated in said figure.

In Fig. 3 I have shown in section a single intermingling zone with portions of adjacent zones and I have represented the solid material in said section by a stipled marking while I have indicated the solvent by light horizontal lines and I have indicated the movement of the solvent through the material by arrows.

In Fig. 8 I have shown a modified form of apparatus which is in all respects similar to the apparatus shown in Fig. 1 except that it is adapted for use with a solvent of heavier specific gravity than that of the material. I have therefore provided feeding means 31 for the solvent material at the bottom of the tank and a receiving compartment or drier 32 connected with the top of the tank through a material discharge conduit 33. In this form of my invention the shaft 34 for rotating the discs, and the shaft 35 for rotating the discharging screw 36, are driven from the bottom of the tank instead of from the top. In this construction also solvent is pumped in at the top of the tank by pump 37 through conduit 37' and miscella passes out through a conduit 38 at the lower end of the tank. In other respects this construction is similar to that shown in Fig. 1.

In Figs. 5 and 6, I have shown other embodiments of my invention which in all respects are substantially similar to the embodiment shown in Fig. 1 except that instead of the discs being flat and disposed in a horizontal plane, these discs 40 (Fig. 5) will be dish-shaped in conformation having openings 40ª and will be rotated in a conical plane, while in Fig. 6 instead of the discs being all dish-shaped, I provide a construction of dish-shaped and flat discs 40' and 41.

In Fig. 9, I have shown still another modified form of my invention, in which, instead of rotating discs the element for retarding the potential movement or supporting the weight of the solid material and guiding the solvent into contact therewith comprises a spiral screw 45 having a pitch which will provide such support and/or retardation and will be caused to rotate in a direction and at a speed which will permit the solid material to move downwardly at a rate of speed lower than its normal movement by gravity.

In Fig. 1, I have shown the tanks 1 provided with heaters 50 and 51 at different positions along the height thereof and different degrees of heat are preferably provided in these heaters to produce heated zones having different degrees of heat, (as hereinabove referred to and as more particularly specified in my former application Serial No. 757,008) while suitable pressure is applied by the pump 16, thus combining the use of heat and pressure zones with the partitioned intermingling zones $a$ to $k$ inclusive.

Similar heaters 50', 51' are applied to the apparatus for heavier liquid solvent shown in Fig. 8, pressure in this case being applied by pump 37.

It will be obvious that heaters and pressure devices may be similarly applied to the other forms of my invention shown in Figs. 5 to 7 and 9, and in Fig. 10, I have shown a fragmentary portion of the extraction section of a unit in which each heater 52 has both its intakes and outlets within a single intermingling zone and two batteries of such heaters are provided.

Having described my invention, I claim:
1. A process for extraction of oils, fats and other soluble constituents from materials containing the same, consisting in substantially filling an extraction unit with a quantity of solid oil-bearing material, retarding the potential movement of said quantity of material and dividing the same by dividing elements into a plurality of blocks, providing said divided blocks with intercommunicating openings at positions out of registration with each other, continuously discharging solid material at one end of said unit to cause vertical movement by potential energy of the material in said blocks through said communicating openings from one block to another thereof, feeding a quantity of said material at the opposite end thereof, moving said dividing elements and the positions of said intercommunicating openings with respect to said blocks of materials, passing liquid solvent in counter-current with the vertical movement of said solid material through said unit, rotating the vertically-moving stream of said solvent in relation to the mass of material and discharging miscella from the unit.

2. A process for extraction of oils, fats and other soluble constituents from materials containing the same, consisting in substantially filling an extraction unit with a quantity of solid oil-bearing material, retarding the potential movement of said quantity of material and dividing the same by dividing elements into a plurality of blocks, providing said divided blocks with intercommunicating openings at positions out of registration with each other, continuously discharging solid material at one end of said unit to cause vertical movement by potential energy of the material in said blocks through said communicating openings from one block to another thereof, feeding a quantity of said material at the opposite end thereof, revolving said dividing elements and intercommunicating openings about the center of the unit and in respect to said blocks of material, passing said liquid solvent in counter-current with said solid material through said revolving openings into said blocks of material, and discharging miscella from the said unit.

3. A process for extraction of oils, fats and other soluble constituents from materials containing the same, consisting in substantially filling an extraction unit with a quantity of solid oil-bearing material, retarding the potential movement of said quantity of material and dividing the same by dividing elements into a plurality of blocks, providing said divided blocks with intercommunicating openings at positions out of registration with each other, continuously discharging solid material at one end of said unit to cause vertical movement by potential energy of the material in said blocks through said communicating openings from one block to another thereof, continuously feeding a quantity of said material at the opposite end thereof, revolving said dividing elements and intercommunicating openings about the center of the unit and in respect to said blocks of material, positively holding said blocks of material from rotating with said dividing elements, passing said liquid solvent in counter-current with said solid material through said revolving openings into said blocks, and discharging miscella from the unit.

4. A process for extraction of oils, fats and other soluble constituents from materials containing the same, consisting in substantially filling an extraction unit with a quantity of solid oil-bearing material, retarding the potential movement of said quantity of material and dividing the same by dividing elements into a plurality of blocks, providing said divided blocks with intercommunicating openings at positions out of registration with each other, revolving said dividing elements and intercommunicating openings, continuously discharging solid material at one end of said unit to cause vertical movement by potential energy of the material in said blocks through said communicating openings from one block to another thereof, continuously feeding a complementary quantity of said material at the opposite end thereof, pumping liquid solvent through said blocks of material under pressure in counter-current with the movement of said solid material, and discharging miscella therefrom.

5. The steps in a process consisting in substantially filling a cylindrical extraction unit with a quantity of solid oil-bearing material, retarding the potential movement of said quantity of material and dividing the same by dividing elements into a plurality of blocks, providing said divided blocks with intercommunicating openings at positions out of registration with each other, revolving said dividing elements and intercommunicating openings, continuously discharging solid material at one end of said unit to cause vertical movement by potential energy of the material in said blocks through said communicating openings from one block to another thereof, feeding a complementary quantity of said material at the opposite end of the unit, passing liquid solvent through said unit under pressure in counter-current with said solid material, and completely obstructing the vertical axial portion of said unit to completely close the path of least resistance to the passage of solvent through said blocks of solid material and to assist in equalizing the distribution of solvent through such blocks.

6. A process for extraction of oils, fats and other soluble constituents from materials containing the same, consisting in substantially filling a cylindrical extraction unit with a quantity of solid oil-bearing material, retarding the potential movement of said quantity of material and dividing the same into a plurality of blocks by dividing elements having radially-disposed openings intercommunicating between blocks at positions out of registration with each other, revolving said dividing elements and intercommunicating openings, continuously discharging solid material at one end of said unit to cause vertical movement by potential energy of the material of said blocks through said intercommunicating radially-disposed openings from one block to another thereof, feeding a complementary quantity of said material at the opposite end of the unit, passing liquid solvent through said unit under pressure in counter-current with said solid material, varying the radial positions of some of said intercommunicating openings with respect to others to equalize the distribution of solvent through said blocks of solid material, and discharging miscella from the unit.

7. A process for extraction of oils, fats and other soluble constituents from materials containing the same, consisting in substantially filling an extraction unit with a quantity of solid oil-bearing material, retarding the potential movement of said quantity of material and dividing the same by dividing elements into a plurality of blocks, providing said dividing elements with intercommunicating openings at positions out of registration with each other, revolving said dividing elements and intercommunicating openings, continuously discharging solid material at one end of said unit to cause vertical movement by potential energy of the material in said blocks through said communicating openings from one block to another thereof, continuously feeding a quantity of said material at the opposite end of said unit, passing liquid solvent under pressure in counter-current with said solid material through said unit, applying heat to said unit at a plurality of zones along the length thereof and discharging miscella therefrom.

8. A process for extraction of oils, fats and other soluble constituents from materials containing the same, consisting in substantially filling an extraction unit with a quantity of solid oil-bearing material retarding the potential movement of said quantity of material and dividing the same by dividing elements into a plurality of blocks, providing said dividing elements with intercommunicating openings at positions out of registration with each other, revolving said dividing elements and intercommunicating openings, continuously discharging solid material at one end of said unit to cause vertical movement by potential energy of the material in said blocks through said communicating openings from one block to another thereof, feeding a quantity of said material at the opposite end thereof, passing liquid solvent under pressure in counter-current with said solid material through said unit, applying heat to said unit at a plurality of zones along the length thereof with different degrees of heat at each zone, and discharging miscella from said unit.

9. A process for the extraction of oils, fats and other soluble constituents from materials containing the same, consisting in charging an extraction unit with a quantity of oil-bearing solid material to form an extracting column, subdividing said extracting column into sections by partitions having openings communicating between such sections, rotating such partitions and openings to pass solid material through said column in a path moving about the axis of the unit, and passing liquid solvent through said column in counter-current with the movement of said solid material in a path moving about the axis of the unit.

10. A process for the extraction of oils, fats and other soluble constituents from materials containing the same, consisting in charging an extraction unit with a quantity of oil-bearing solid material to form an extracting column, subdividing said extracting column into sections by partitions having openings communicating between such sections, rotating such partitions and openings to pass solid material through said column in a path moving about the axis of the unit, passing liquid solvent through said column in counter-current with the movement of said solid material in a path moving about the axis of the unit, and holding the main body of material in each of the sections against rotation.

11. A process for the extraction of oils, fats and other soluble constituents from materials containing the same, consisting in charging an extraction unit with a quantity of oil-bearing solid material to form an extracting column, subdividing said extracting column into sections by partitions having openings communicating between such sections, rotating such partitions and openings to pass solid material through said column in a path moving above the axis of the unit, passing liquid solvent through said column in counter-current with the movement of said solid material in a path moving about the axis of the unit, holding the main body of material in each of said sections against rotation by providing a damming element for a portion of such body against rotary movement with the partitions and producing a secondary intermingling of solid material overflowing the damming element with solvent in a relatively open solvent-filled space within each section.

12. Apparatus for extraction of oils, fats and other soluble constituents from materials containing the same, comprising an extraction unit provided at one end with a feeding means for solid material and at the opposite end with means for discharging said material, an inlet conduit for liquid solvent connected with said unit adjacent to said material discharge end thereof, a discharge conduit for miscella located adjacent to the end of the unit opposite to the end to which the solvent inlet is connected, said unit having an extraction portion between said ends, pressure-equalizing partitions having radially-disposed discharge openings located out of registration with each other and arranged in said extraction portion of said unit to sustain the pressure of the solid material and equalize such pressure at varying levels in the unit, and means for moving said partitions.

13. Apparatus for extraction of oils, fats and other soluble constituents from materials containing the same, comprising an extraction unit provided at one end with a feeding means for solid material and at the opposite end with means for discharging said solid material, an inlet conduit for liquid solvent connected with said unit adjacent to said material discharge end thereof, a discharge conduit for miscella located adjacent to the end of the unit opposite to the end to which the solvent inlet is connected, said unit having a cylindrical extraction portion between said ends, and retarding means comprising a plurality of horizontally-disposed discs, arranged in said extraction portion of said unit to retard potential movement of said solid material therethrough and dividing the extraction portion of said unit into a plurality of compartments, said discs being provided with openings communicating between contiguous compartments and located out of registration with each other, and means for rotating said discs and openings about the axis of said unit.

14. Apparatus for extraction of oils, fats and other soluble constituents from materials containing the same, comprising an extraction unit provided at one end with a feeding means for solid material, means for discharging said material, at the opposite end, an inlet conduit for liquid solvent connected with said unit adjacent to said material discharge end thereof; a discharge conduit for miscella located adjacent to the end of the unit opposite to the end to which the solvent inlet is connected, said unit having a cylindrical extraction portion between said ends, and retarding means comprising a plurality of horizontally-disposed discs arranged in said extraction portion of said unit to retard potential movement of said solid material therethrough and dividing the extraction portion of said unit into a plurality of compartments, said discs being provided with openings communicating between said compartments located out of registration with each other, means for rotating said discs and openings about the axis of said unit, and means within said unit for holding the solid material within said compartments from rotating with said partitions.

15. Apparatus for extraction of oils, fats and other soluble constituents from materials containing the same, comprising an extraction unit provided at one end with a feeding means for solid material, means for discharging said material, means for forming a liquid-impermeable plug of material at said discharge end, an inlet conduit for liquid solvent connected with said unit adjacent to said material discharge end thereof, a discharge conduit for miscella located adjacent to the end of the unit opposite to the end to which the solvent inlet is connected, said unit having a cylindrical extraction portion between said ends, and retarding means comprising a plurality of horizontally-disposed discs arranged in said extraction portion of said unit to retard potential movement of said solid material therethrough and dividing the extraction portion of said unit into a plurality of compartments, said discs being provided with openings communicating between said compartments located out of registration with each other, means for rotating said discs and openings about the axis of said unit, and means within said unit for holding the solid material within said compartments from rotating with said partitions.

MICHELE BONOTTO.

CERTIFICATE OF CORRECTION.

Patent No. 2,156,236. April 25, 1939.

MICHELE BONOTTO

It is hereby certified that error appears in the printed specification of the above numbered patent requiring correction as follows: Page 1, first column, line 10, for the word "continuance" read continuous; page 2, first column, line 13, for "he" read the; page 3, second column, line 36, for "is" read in; page 6, first column, line 75, claim 11, for the word "above" read about; and that the said Letters Patent should be read with this correction therein that the same may conform to the record of the case in the Patent Office.

Signed and sealed this 30th day of May, A. D. 1939.

Henry Van Arsdale (Seal) Acting Commissioner of Patents.